(12) United States Patent
Correa et al.

(10) Patent No.: US 10,762,404 B1
(45) Date of Patent: Sep. 1, 2020

(54) AUTOMATED NAME CALLING SYSTEM

(71) Applicants: Antonio Correa, Royal Palm Beach, FL (US); Mary Stratos, Boynton Beach, FL (US)

(72) Inventors: Antonio Correa, Royal Palm Beach, FL (US); Mary Stratos, Boynton Beach, FL (US)

( * ) Notice: Subject to any disclaimer, the term of this patent is extended or adjusted under 35 U.S.C. 154(b) by 0 days.

(21) Appl. No.: 16/601,972

(22) Filed: Oct. 15, 2019

(51) Int. Cl.
| | |
|---|---|
| G08B 13/14 | (2006.01) |
| G06K 19/02 | (2006.01) |
| G06F 3/14 | (2006.01) |
| H04N 7/18 | (2006.01) |
| G06K 7/10 | (2006.01) |

(52) U.S. Cl.
CPC .............. *G06K 19/027* (2013.01); *G06F 3/14* (2013.01); *G06K 7/10425* (2013.01); *H04N 7/188* (2013.01)

(58) Field of Classification Search
CPC ............. G06K 19/027; G06K 9/00288; G06K 9/00677; G06F 15/16; G06F 17/30; G06F 17/40
See application file for complete search history.

(56) References Cited

U.S. PATENT DOCUMENTS

| | | | |
|---|---|---|---|
| 7,362,219 B2* | 4/2008 | Nogami | G07C 9/28 340/505 |
| 2004/0006445 A1 | 1/2004 | Paek | |
| 2017/0255820 A1* | 9/2017 | Liu | G06K 9/00677 |

* cited by examiner

*Primary Examiner* — Toan N Pham
(74) *Attorney, Agent, or Firm* — Sanchelima & Associates, P.A.; Christian Sanchelima; Jesus Sanchelima

(57) ABSTRACT

An automated name calling system and method including an RFID assembly, a camera assembly, and podium assembly is disclosed herein. The RFID assembly includes RFID tags that may be mounted to clothing accessories such as wristbands, buttons, and the like. The RFID assembly further includes an RFID reader that is mounted to either clothing articles such as gloves or is mounted to be stationary. In the event of a graduation ceremony a student receives an RFID tag provided by the school's faculty. As the student begins walking to have their name called, the camera assembly will automatically take pictures of the student as they walk for graduation. Before a student walks the stage, the student will pass an RFID reader that will automatically display the students name to the podium assembly. Additionally, the podium assembly includes a headset that provides a user the pronunciation of a student's name.

10 Claims, 4 Drawing Sheets

100

- An organization holding a name calling ceremony provides a user with an RFID tag — 110
- As the user is walking to have their name called RFID information is collected by the RFID reader — 120
- Information collected by RFID reader is provided on a display located on a podium and the users name is called — 130
- Cameras automatically take pictures of the user — 140

AUTOMATED NAME CALLING SYSTEM

BACKGROUND OF THE INVENTION

1. Field of the Invention

The present invention relates to an automated name calling system and, more particularly, to an automated name calling system that comprises a user having an RFID tag containing said user's personal information and an RFID reader to automatically read a user's personal information such as their name in an event such as a graduation ceremony.

2. Description of the Related Art

Several designs for an automated name calling system have been designed in the past. None of them, however, include a system and method for announcing the name of a person as they pass by and an RFID sensor for use at a graduation ceremony or similar event comprising a user attached RFID antenna which is registered with personal information including their name and personal photographs or videos where information from the RFID device is automatically displayed when the person walks past a scanner. It is known that in the event of a graduation ceremony a student's name is called out by a reader as they walk across the stage of the graduation ceremony. It is also known that it is extremely difficult to keep track of all the names that are to be called during the graduation ceremony. The current system used utilizes name calling cards wherein a reader at a graduation ceremony reads out the name of the student that is walking the stage for graduation. This current system is extremely inefficient and often times a reader may mispronounce a student's name as they walk the platform. Therefore, there is a need for an automated name calling system for use during a graduation ceremony. The present invention addresses these issues by providing a name calling system utilizing RFID technology to automatically collect a student's name and display it to the reader of a graduation ceremony.

Applicant believes that a related reference corresponds to U.S. patent No. 2004/0006445 for a number label embedded with antenna tag for measuring race runner's time records via wireless identification, and runners' time records measurement method and system using the same. However, it differs from the present invention because the reference fails to address the issue of providing an efficient solution to the name calling process in special events such as a graduation ceremony. The present invention addresses this issue by providing an RFID assembly efficiently implemented through the use of clothing articles and accessories. As an individual walk up to the platform during a graduation ceremony, an RFID reader will gather information such as the name from said individual to then display it on a display for a reader of a graduation ceremony to read aloud.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an automated name calling system that may be used during a graduation ceremony to eliminate the need of name calling cards during a graduation ceremony by utilizing an RFID tag and reader to provide a system to automatically display a student's name on a display to the reader of a graduation ceremony.

It is another object of this invention to provide an automated name calling system that will automatically pronounce a student's name to a user through a headset once the RFID tag is detected by an RFID reader.

It is still another object of the present invention to provide an automated name calling system that comprises at least one camera adapted to automatically capture a picture of a student when said camera detects the RFID tag.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
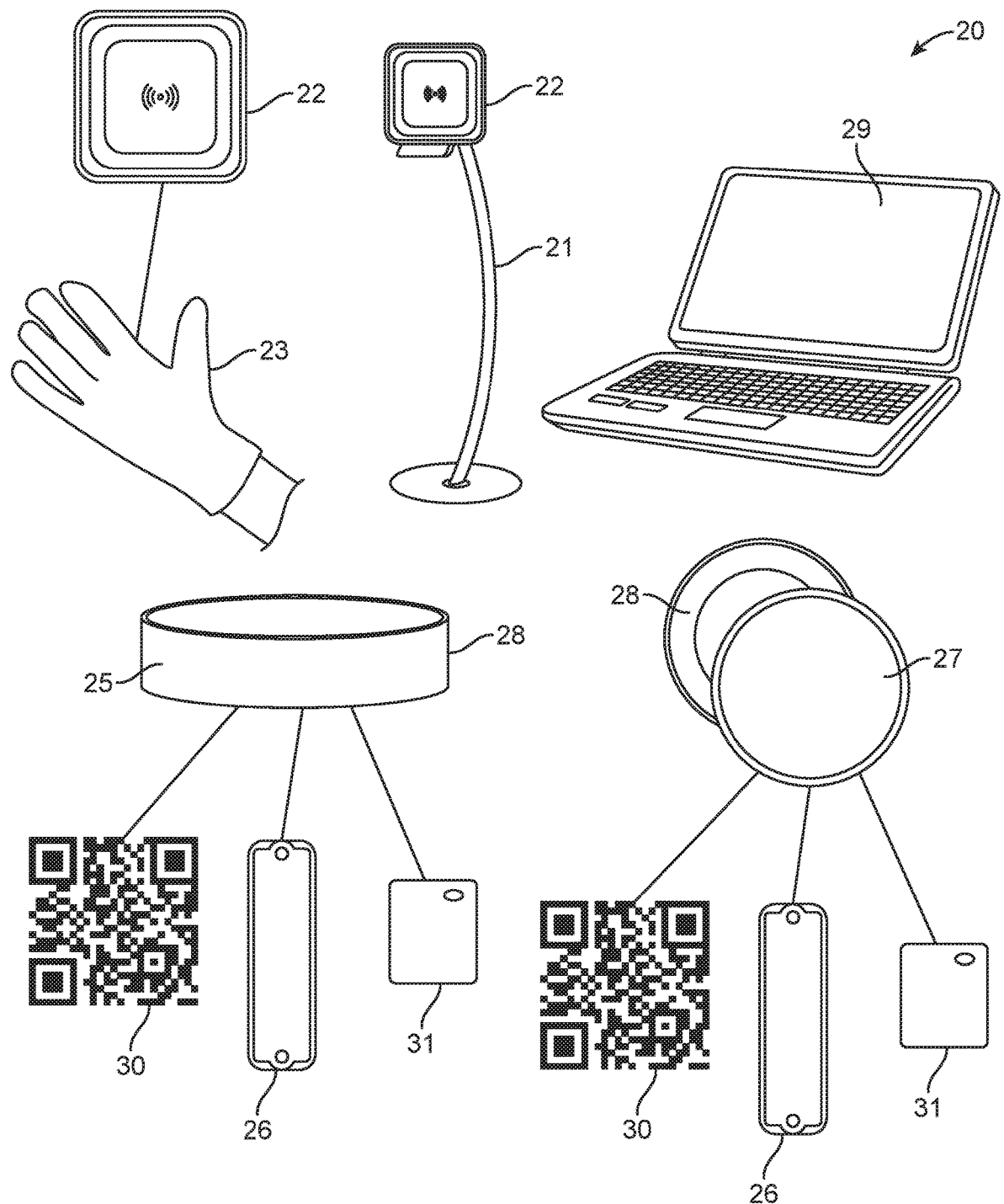
FIG. 1 represents a view of RFID assembly 20 in accordance with one embodiment of the present invention.
Figure 2:
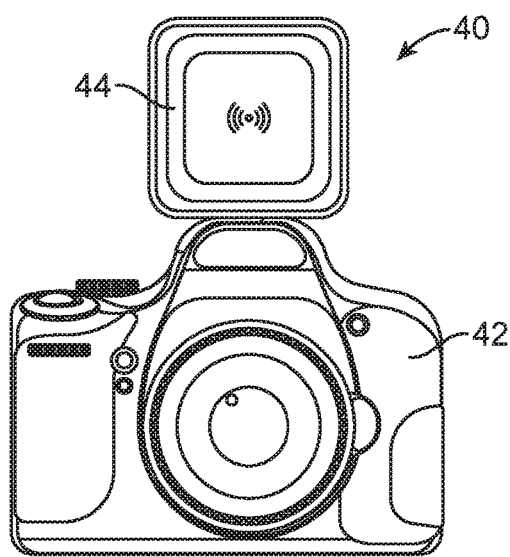
FIG. 2 shows a view of camera assembly 40 in accordance with one embodiment of the present invention.
Figure 3:
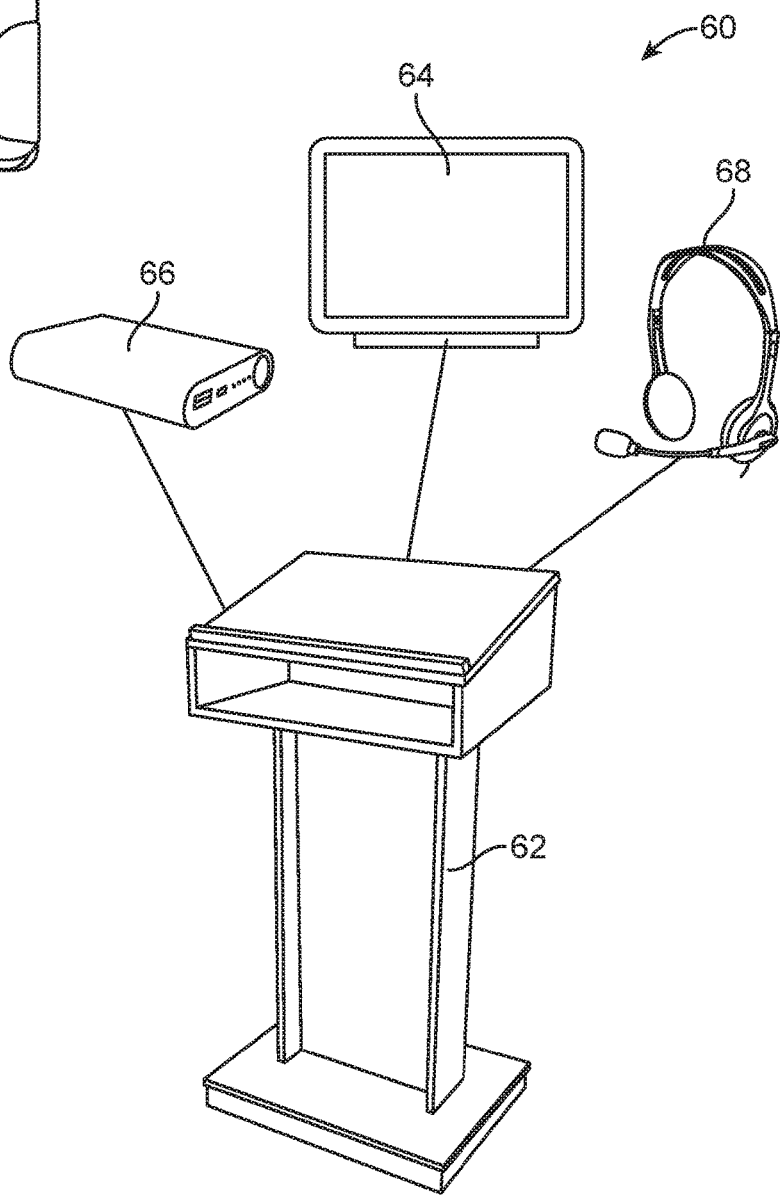
FIG. 3 illustrates a view of podium assembly 60 in accordance with one embodiment of the present invention.
Figure 4:
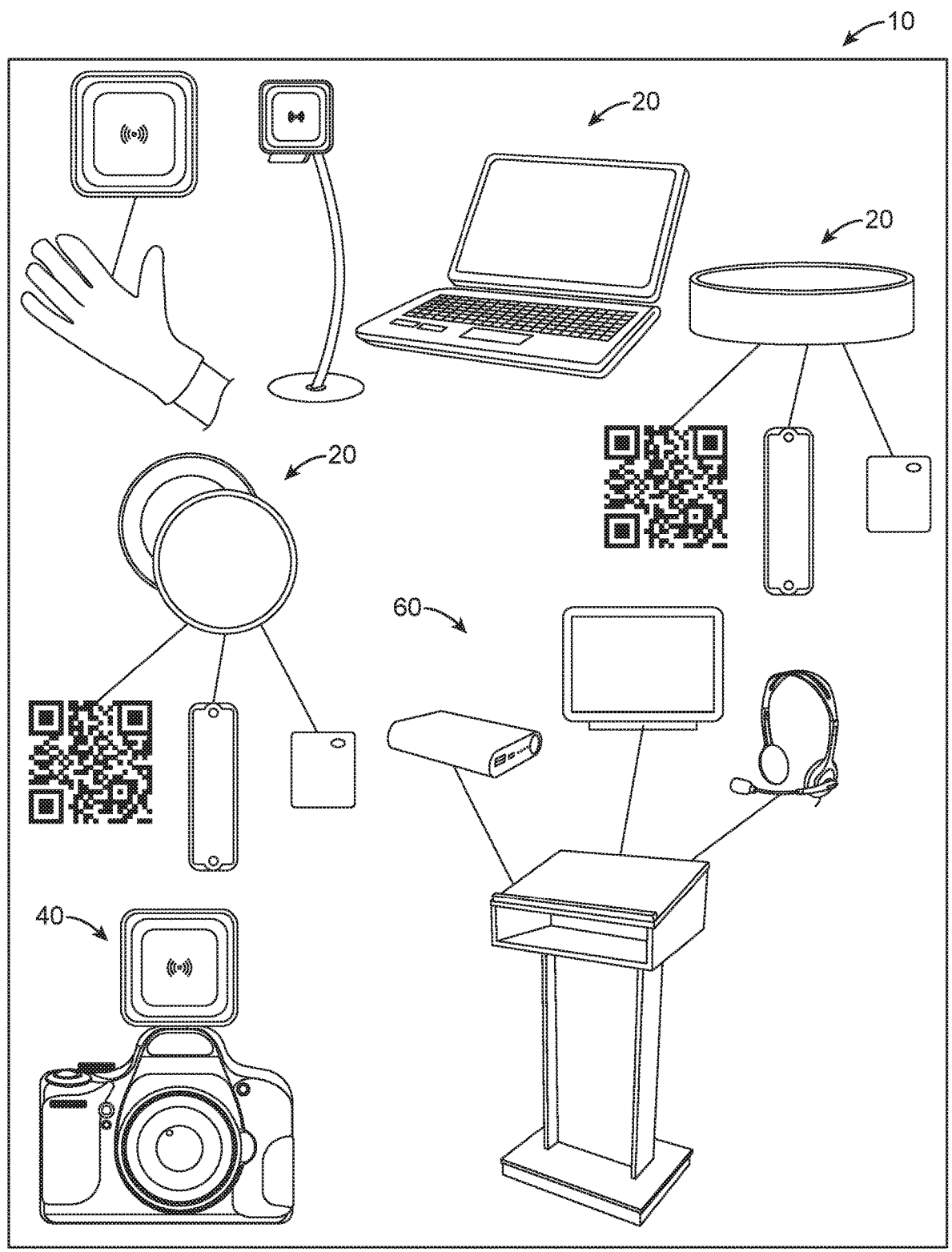
FIG. 4 is a representation of an automated name calling system 10 in accordance with one embodiment of the present invention.
Figure 5:
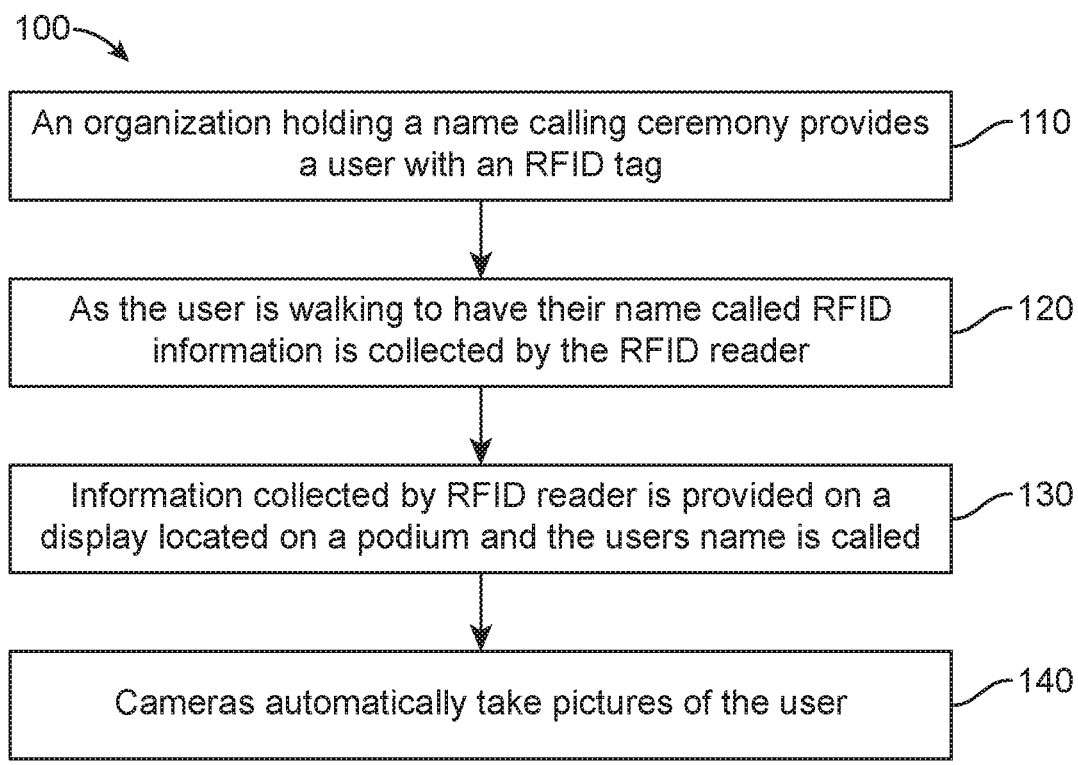
FIG. 5 Represents a method 100 for an automated name calling system 10.

Referring now to the drawings, where the present invention is generally referred to with numeral 10, it can be observed an automated name calling system 10 that it basically includes an RFID assembly 20, a camera assembly 40, and a podium assembly 60.

RFID assembly 20 includes an RFID reader 22, and an RFID tag 26. In the present embodiment RFID tag 26 is attached to clothing accessories 28 such as a wristband 25, a button 27, and the like. In one embodiment, wristband 25 may also include additional snap on accessories to provide unique versions of wristband 25 to different users that are wearing them. In one embodiment, automated name calling system 10 is used in a high school setting. In this setting, wristband 25 may include additional snap on accessories to represent a student's high school sports team or their club. Examples may include snap on accessories of a football, chess piece, and so on. In another embodiment, the wristbands are customizable such that schools or organizations can add slide on or clip on football icons or basketball icons or any other teams or accomplishments into the wristband. RFID tag 26 may be configured to hold personal information of an individual such as a person's name and photo. In one embodiment, RFID assembly 20 is used in a name calling ceremony such as a graduation wherein said RFID tag 26 contains a user's name and academic information. Information may be uploaded to said RFID tag 26 by means of a computer 29. RFID tag 26 may communicate with said computer 29 by wired means such USB cables and the like. RFID tag 26 may also communicate with said computer by means of wireless communication such as WIFI, Bluetooth, and the like. When said RFID tag 26 is attached to said computer 29 information stored within said RFID tag 26 may be uploaded, downloaded, and modified. RFID reader 22 is configured to collect the information stored within said RFID tag 26 when said RFID tag 26 comes within a predetermined distance of RFID reader 22. In one embodiment, RFID reader 22 may come in the form of a glove 23 wherein a user having said RFID tag 26 mounted to a wristband 25 may shake another user's hand having said glove 23 thereby collecting the information stored within said RFID tag 26. In another embodiment, RFID reader 22 may come in the form of a stationary reader 21 wherein a user having said RFID tag 26 may walk up to said stationary reader 21 to have information stored within said RFID tag 26 collected. In another embodiment of the present invention, clothing accessories 28 may also include a GPS tracking device 31 where in the location of a user may be identified through the use of said GPS tracking device 31. In yet another embodiment, clothing accessories 28 may further include a QR code 30 which can be scanned by a user's electronic device such as phones, tablets, and the like. When said QR code 30 is scanned by said user, the information stored within RFID tag 26 is made available to said user.

Camera assembly 40 includes at least one camera 42 and a camera RFID reader 44. In the event of a name calling ceremony, at least one camera 42 may be placed around the location of said ceremony. It should be understood that any number of cameras may be placed on any location of said name calling ceremony. At least one camera 42 comprises a camera RFID reader 44 mounted unto them. At least one camera 42 is configured to automatically take a picture of a user having said RFID tag 26 when said user comes within a predetermined distance of at least one camera 42. In one embodiment, camera assembly 40 may be implemented into a graduation ceremony wherein at least one camera 42 is placed within said ceremony to automatically capture pictures of students as they are graduating.

Podium assembly 60 includes a podium 62, a display 64, and a battery bank 66 and a headset 68. Display 64 is mounted unto said podium 62. Display 64 is configured to display the information collected by said RFID reader 22 from said RFID tag 26. In one embodiment, display 64 may come in the form of a laptop, tablet, and the like. Battery Bank 66 is provided to said podium 62 to provide an additional power source to said display 64. Additionally, headset 68 is worn by a user using said podium 62. Headset 68 is configured to provide said user with the pronunciation of the name collected by said RFID reader 22. As a result, said user is aided in pronouncing the name of an individual participating in a name calling ceremony. Headset 68 is in communication with said display 64, providing a user with the pronunciation of every name appearing on said display 64.

In one embodiment, automated name calling system 10 is used in a graduation ceremony. In the event of said graduation ceremony a student is provided an RFID tag 26 mounted to clothing accessories 28 such as a wristband 25 and a button 27. RFID tag 26 contains a student's information such as their picture and name. As a student begins to get ready to walk for their graduation, said student has their RFID tag 26 scanned by an RFID reader 22 in the form of a glove 23 or a stationary reader 21. Once said RFID tag 26 has been scanned, the information stored within said RFID tag 26 is transferred to said podium assembly 60. The information is displayed on said display 64 of said podium 62 wherein a reader using said podium 62 may read the name of the student presented on the display 64 for the graduation ceremony. Additionally, said headset 68 is configured to provide said reader with a pronunciation of the names being displayed on display 64. Furthermore, as a student is walking for their graduation, at least one camera 42 automatically take pictures of said students when the RFID tag 26 of said student comes within a predetermined range of said camera RFID reader 44 of at least one camera 42. In an additional embodiment, automated name calling system 10 may be used as a security utility system that stores student's information such as name, picture, and class schedules. Additionally, the location of the students may be tracked using RFID technology. As a result, the wearable device may be used to replace ID cards within a school environment.

Automated name calling system 10 further comprises a method 100 including an input step 110, a scanning step 120, a name calling step 130, and a camera step 140. In input step 110, an organization holding a name calling ceremony may provide a user with an RFID tag 26 mounted to clothing accessories 28 such as a wristband 25 or button 27. RFID tag 26 contains said user's information such as their name and picture. In scanning step 120, said user begins walking to a platform of said name calling ceremony. Before said user walks the platform to have their name called, said user's RFID tag 26 is scanned by an RFID reader 22 in the form of a glove 23 or a stationary reader 21. RFID reader 22 then collects the data stored within said RFID tag 26. In the name calling step 130, the information collected within said RFID tag 26 is then displayed onto said display 64 on said podium 22 wherein a reader using said podium 22 may read the names displayed on said display 64 for the name calling ceremony. Additionally, the reader is provided a headset 68 wherein said headset 68 provides the reader with the pronunciation of the names displayed on display 64 to aid the reader in reading aloud names for a name calling ceremony. In camera step 140, at least one camera 42 automatically takes pictures of said user walking the platform in a name calling ceremony when said user is within a predetermined distance of said camera RFID reader 44 mounted to at least one camera 42. The pictures captured by at least one camera 42 are then stored on computer 29.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. An automated name calling system, comprising:
   a. an RFID assembly including an RFID reader and an RFID tag, said RFID assembly further including clothing accessories, said RFID tag being mounted to said clothing accessories, wherein said RFID reader is in wireless communication with said RFID tag when said RFID tag is within a predetermined distance of said RFID reader, said RFID tag is mounted to said clothing accessories;
   b. a camera assembly including at least one camera and a camera RFID reader, said camera RFID reader establishes wireless communication with said RFID tag within a predetermined distance and automatically takes a picture of a user;

c. a podium assembly including a podium, a display, a battery bank, and a headset, said battery bank is configured to power said display; wherein said RFID reader is in wireless communication with said display wherein the information collected by said reader is displayed on said display.

2. The automated name calling system of claim 1 wherein said RFID reader is in the form of a stationary reader or a glove.

3. The automated name calling system of claim 1 wherein said clothing accessories are in the form of a wristband or a button.

4. The automated name calling system of claim 3 wherein said wristband and button includes a QR code configured to display a student's information when scanned by a user.

5. The automated name calling system of claim 1 wherein said clothing articles may accessories contain a GPS tracking device.

6. The automated name calling system of claim 1 wherein said headset provides the user with an audible pronunciation of a name collected from said RFID reader.

7. The automated name calling system of claim 1 wherein the information stored within said RFID tag is adapted to be modified from a computer.

8. An automated name calling method, comprising:
   a. an input step wherein an organization may input information into an RFID tag to be assigned to a user in a form of clothing articles in an event of a name calling ceremony, said information being a user's name and picture, said RFID tag is modified remotely or connected directly to a computer for inputting user data, in said input step the user receives said RFID tag and is seated for said name calling ceremony;
   b. a scanning step in which the user will then have their RFID tag scanned by an RFID reader in a form of a glove or a stationary reader before they walk a platform to have their name called;
   c. a name calling step in which the information scanned by the RFID reader is then displayed on a display located on a podium for a reader to read out loud in the name calling ceremony;
   d. a camera step in which a camera will automatically take a picture of said user on the platform after their name has been called.

9. The automated name calling method of claim 8 wherein said name calling step the reader also receives a pronunciation of the user's name through a headset.

10. The automated name calling method of claim 8 wherein said user can access the pictures taken in the camera step.

* * * * *